(12) United States Patent
Honma et al.

(10) Patent No.: US 6,493,193 B2
(45) Date of Patent: Dec. 10, 2002

(54) MR HEAD WITH MR ELEMENT AND REINFORCING BODY MOUNTED VIA NON-ORGANIC FILM

(75) Inventors: Yoshiyasu Honma, Osaka (JP); Hiroyuki Hasegawa, Kyoto (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/956,336

(22) Filed: Sep. 18, 2001

(65) Prior Publication Data

US 2002/0008944 A1 Jan. 24, 2002

Related U.S. Application Data

(63) Continuation of application No. PCT/JP00/08353, filed on Nov. 27, 2000.

(30) Foreign Application Priority Data

Jan. 20, 2000 (JP) ........................................ 2000-012218

(51) Int. Cl.[7] .............................. G11B 5/255; G11B 5/39
(52) U.S. Cl. ....................... 360/313; 360/324; 360/327; 360/122; 360/126
(58) Field of Search ........................ 360/313, 317–319, 360/126, 128, 324, 327, 122

(56) References Cited

U.S. PATENT DOCUMENTS 5,793,579 A * 8/1998 Yamamoto et al. ......... 360/126
5,999,368 A * 12/1999 Katayama ................. 360/235.2
6,208,545 B1 * 3/2001 Leedy .......................... 365/51
6,287,437 B1 * 9/2001 Pandhumsoporn et al. ...... 204/298.13

FOREIGN PATENT DOCUMENTS

| JP | 5-36012   | 2/1993  |
|----|-----------|---------|
| JP | 5-117842  | 5/1993  |
| JP | 6-169161  | 6/1994  |
| JP | 8-306009  | 11/1996 |
| JP | 11-316914 | 11/1999 |
| JP | 11-328623 | 11/1999 |

OTHER PUBLICATIONS

Article: "High–Density Recording Using MR Heads in Helical–Scan Tape Systems" T. Ozue et al, IEEE Transactions on Magnetics, vol. 34, No. 4, pp. 1492–1494 (Jul. 1998).

* cited by examiner

Primary Examiner—Jefferson Evans
(74) Attorney, Agent, or Firm—Merchant & Gould P.C.

(57) ABSTRACT

In order to improve reliability of an MR head including a substrate, an MR element formed on the substrate, a reinforcing body, and a sliding surface with respect to a magnetic recording medium, in which the substrate and the MR element are exposed to the sliding surface, the substrate and the reinforcing body are bonded to each other by using a non-organic film, for example, a multi-layered film including metal layers. Alternatively, the substrate and the reinforcing body are bonded to each other via an adhesive film not exposed to the sliding surface.

18 Claims, 12 Drawing Sheets

MR HEAD WITH MR ELEMENT AND REINFORCING BODY MOUNTED VIA NON-ORGANIC FILM

This is a continuation of application No. PCT/JP00/08353, filed Nov. 27, 2000.

BACKGROUND OF THE INVENTION

1. Field of the Invention

The present invention relates to a magneto-resistive (MR) head provided with an MR element, and in particular, to an MR head that runs in contact with a magnetic medium and a method for producing the same. The present invention also relates to a magnetic recording/reproducing apparatus using the MR head.

2. Description of the Related Art

In recent years, to increase the density of magnetic recording, attention has been given to producing a magnetic head using a thin film technique. In particular, an MR head is being studied as a head of a rotating drum type VTR and the like (for example, IEEE TRANSACTIONS ON MAGNETICS, Vol. 34, No. 4, July 1998 (SONY)).

FIGS. 10 and 11 respectively show a perspective view and a cross-sectional view of a typical configuration of an MR head (yoke type). The MR head comes into contact with a recording medium, such as a magnetic tape and a magnetic disk, on a side face 10 on the left side of the figure. A magnetic flux generated from the recording medium is guided from a lower magnetic yoke 11 to an upper rear magnetic yoke 13, an MR element 14, and an upper front magnetic yoke 15, and a change in resistance caused by magnetization rotation of the MR element 14 is taken out from an output terminal 16. The MR head further is provided with a magnetic gap 18, a bias layer 19, a protective film 20, a lower substrate 21, an upper substrate 22, and an adhesive film 23. In order to show an internal configuration, in FIG. 10, the protective film 20, the adhesive film 23, and the upper substrate 22 are not shown.

An MR element portion 30 is formed by a thin film formation technique, so that it is weak in terms of strength unlike a bulk material. Therefore, the element portion is interposed between the lower substrate 21 and the upper substrate (reinforcing body) 22. In order to bond the MR element portion 30 to such a substrate, the adhesive film 23 is provided at least on one side of the MR element portion 30. As the adhesive film 23, an organic adhesive is used.

However, when the MR head is allowed to slide over the recording medium, a component of the recording medium adheres to the adhesive film 23 exposed to a sliding surface between the MR head and the recording medium. On the other hand, a component of the adhesive film also adheres to the recording medium. Because of these adhesions, both the MR head and the recording medium are likely to be damaged.

Furthermore, due to the difference in material between the adhesive film 23, and the lower substrate 21 and the upper substrate (reinforcing body) 22, as the MR head runs in sliding contact with the recording medium, recession (biased abrasion) becomes more likely to occur in the MR head. When the gap occurs between the MR head and the recording medium because of the recession on the sliding surface, a spacing loss degrades reproduction characteristics.

SUMMARY OF THE INVENTION

The present invention provides an MR head that is capable of suppressing a decrease in reliability even when it slides over a magnetic recording medium, and a method for producing the same. The present invention also provides a magnetic recording/reproducing apparatus using the MR head.

According to the present invention, in an MR head including a substrate, an MR element portion formed on the substrate, a reinforcing body, and a sliding surface with respect to a magnetic recording medium, the substrate and the MR element portion being exposed to the sliding surface, the substrate and the reinforcing body are bonded to each other in such a manner that an organic film is not exposed to the sliding surface with respect to the magnetic recording medium.

In one embodiment of the MR head according to the present invention, the substrate and the reinforcing body are bonded to each other via a non-organic film.

In another embodiment of the MR head according to the present invention, the substrate and the reinforcing body are bonded to each other via an adhesive film that is not exposed to the sliding surface with respect to the magnetic recording medium. The adhesive film may be an organic film or a non-organic film. However, it is preferable that the adhesive film is not formed in a range of 5 $\mu$m from the sliding surface along an interface between the substrate and the reinforcing body.

Furthermore, according to the present invention, an MR head including a substrate, an MR element portion formed on the substrate, a reinforcing body, and a sliding surface with respect to a magnetic recording medium, in which the substrate and the MR element portion are exposed to the sliding surface, is produced by a method including the acts of: forming an MR element portion on a surface of a substrate; forming a flat surface above the MR element portion; forming non-organic films each including metal layers respectively on the flat surface and the surface of the reinforcing body; and subjecting the metal layers to solid-phase welding, thereby bonding the substrate and the reinforcing body to each other.

Furthermore, according to the present invention, a magnetic recording/reproducing apparatus including the above-mentioned MR head and a magnetic recording/reproducing apparatus including the MR head produced by the above-mentioned method are provided.

These and other advantages of the present invention will become apparent to those skilled in the art upon reading and understanding the following detailed description with reference to the accompanying figures.

DESCRIPTION OF THE PREFERRED EMBODIMENTS

Figure 1:
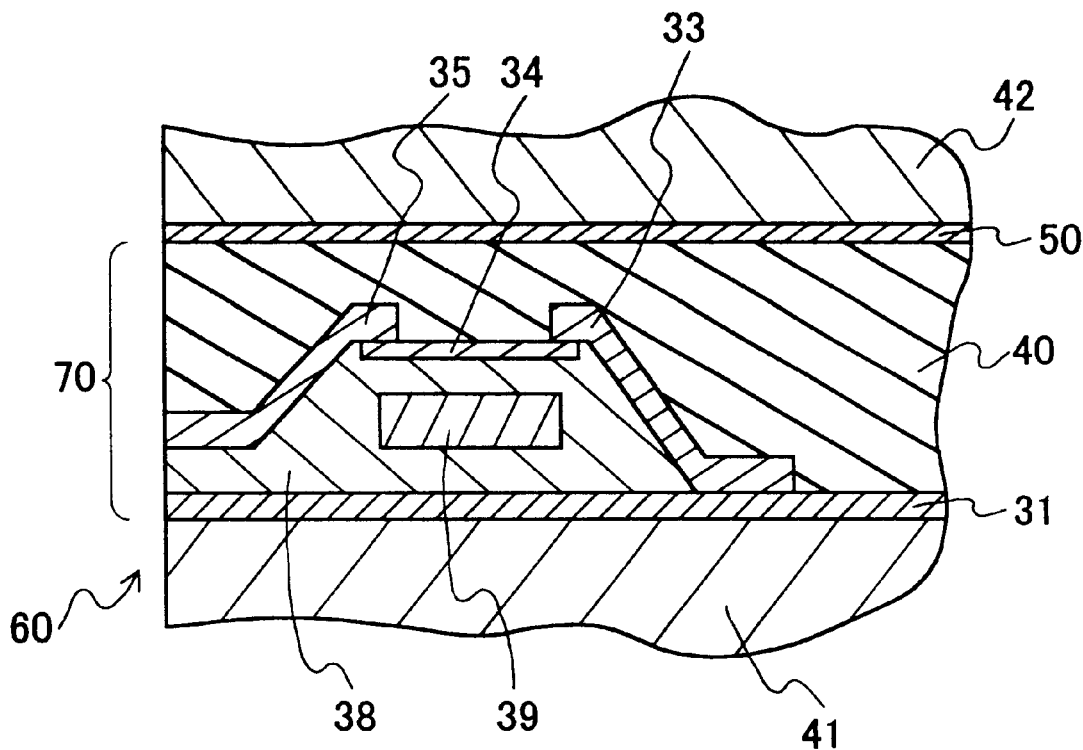
FIG. 1 is a partial cross-sectional view showing one embodiment of an MR head of the present invention.

In one embodiment, an adhesive film provided on an interface between a substrate and a reinforcing body is a non-organic film, specifically, a non-organic film including a metal layer. More specifically, a multi-layered film including a noble metal layer, in particular, a metal multi-layered film including a noble metal layer is preferable. As the multi-layered film, a metal multi-layered film can be illustrated in which a base metal (metal other than noble metal) layer is disposed on both sides of a noble metal layer. As the noble metal layer, an Au layer or a Pt layer is preferable. As the base metal, although Ti, W, Mn, Ta, and the like can be used, a Cr layer is preferable as a base metal layer.

In order to decrease an area of the adhesive film exposed to a sliding surface, the thickness of the adhesive film should be thinner. However, when the adhesive film is too thin, sufficient adhesion strength may not be ensured. Therefore, the thickness of the non-organic film preferably is 20 to 90 nm.

In the metal multi-layered film illustrated above, it is appropriate that the film thickness of the noble metal layer is 10 to 50 nm, and the film thickness of the base metal layer is 5 to 20 nm. A particularly preferable example of the metal multi-layered film is a Cr layer (film thickness: 5 to 20 nm)/Au layer or a Pt layer (film thickness: 10 to 50 nm)/Cr layer (film thickness: 5 to 20 nm).

In the case where the adhesive film is formed so as not to be exposed to the sliding surface, an organic adhesive film formed by coating of an adhesive or the like may be used. The thickness of the organic film may be 10 to 1000 nm.

As a preferable method for bonding the substrate to the reinforcing body, there is solid-phase welding of metal conducted by heating and pressurizing a pair of opposed metal layers.

The solid-phase welding can be conducted, for example, as follows: a non-organic film formed on each surface of the substrate and the reinforcing body is made of a metal multi-layered film including a base metal layer and a noble metal layer formed in this order, and the noble metal layer is subjected to solid-phase welding. In this case, the thickness of the noble metal layer (preferably, an Au layer or a Pt layer) preferably is 5 to 25 nm. The film thickness of the noble metal layer and the base metal layer (preferably, a Cr layer) after bonding preferably is in the above-mentioned range.

The solid-phase welding of metal layers may be conducted at 100° C. to 200° C., more preferably at 150° C. or lower for the following reason. When the metal layers are treated at a high temperature, the characteristics of the MR head may be degraded.

The substrate and the reinforcing body may be bonded to each other without using a noble metal layer. In this case, it only is required that metal layers are formed, for example, in an atmosphere under reduced pressure so that an oxide film will not inhibit bonding, and subsequently, the metal layers are subjected to solid-phase welding in the atmosphere under reduced pressure.

Hereinafter, the present invention will be described in more detail by way of an embodiment with reference to the drawings.

The MR head shown in FIG. 1 comes into contact with a recording medium, such as a magnetic tape and a magnetic disk, on a sliding surface 60 on the left side of the figure. A magnetic flux generated from the recording medium is guided from a lower magnetic yoke 31 to an upper rear magnetic yoke 33, an MR element 34, and an upper front magnetic yoke 35. A change in resistance caused by magnetization rotation of the MR element 34 is taken out from an output terminal (not shown). The MR head further is provided with a magnetic gap 38, a bias layer 39, a protective film 40, a lower substrate 41, an upper substrate (reinforcing body) 42, and a non-organic adhesive film 50. Thus, in the MR head, the substrate 41 with an MR element portion 70 formed thereon and the reinforcing body 42 are bonded to each other via the non-organic film 50.

Since an organic material such as an adhesive is not used for the adhesive film, even when the MR head is allowed to slide over the recording medium, adhesion of a component from one side to the other between the adhesive film and the recording medium can be suppressed. Thus, the MR head and the recording medium can be prevented from being damaged.

Furthermore, since the difference in abrasion characteristics of materials exposed to the sliding surface is small, recession associated with running of the MR head in sliding contact with the recording medium is unlikely to occur. This suppresses generation of a spacing loss between the MR head and the recording medium, whereby stable reproduction characteristics can be obtained.

Figure 12:
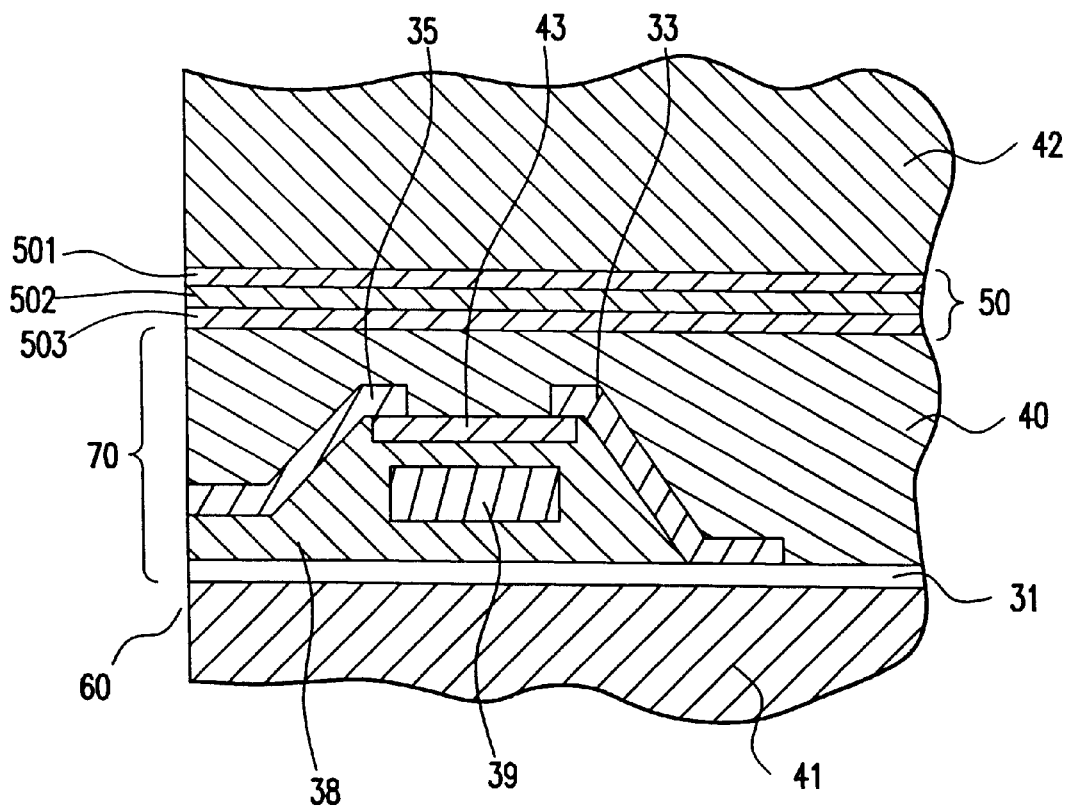
FIG. 12 is a partial cross-sectional view of an embodiment of an MR head of the present invention, with an adhesive film including a central noble metal layer and base metal layers on both sides thereof.

As described above, the adhesive film 50 has a film configuration, for example, in which a noble metal layer 502 of Au, Pt or the like is disposed as a central layer, and base metal layers 501 and 503 of Cr or the like are disposed on both sides of the central layer 502. Such a structure is shown in partial cross-section in FIG. 12. This metal multi-layered film can be formed by the solid-phase welding of noble metal layers. When the solid-phase welding is adopted, bonding can be conducted at a low temperature of about 100° C. to about 200° C. In general, the MR element is weak to heat, so that bonding at a low temperature by the solid-phase welding method is an effective method taking advantage of the characteristics of the MR element.

The total thickness of the adhesive film preferably is about 20 to 90 nm, in particular, 20 to 50 nm, and for example, about 30 nm.

Figure 2:
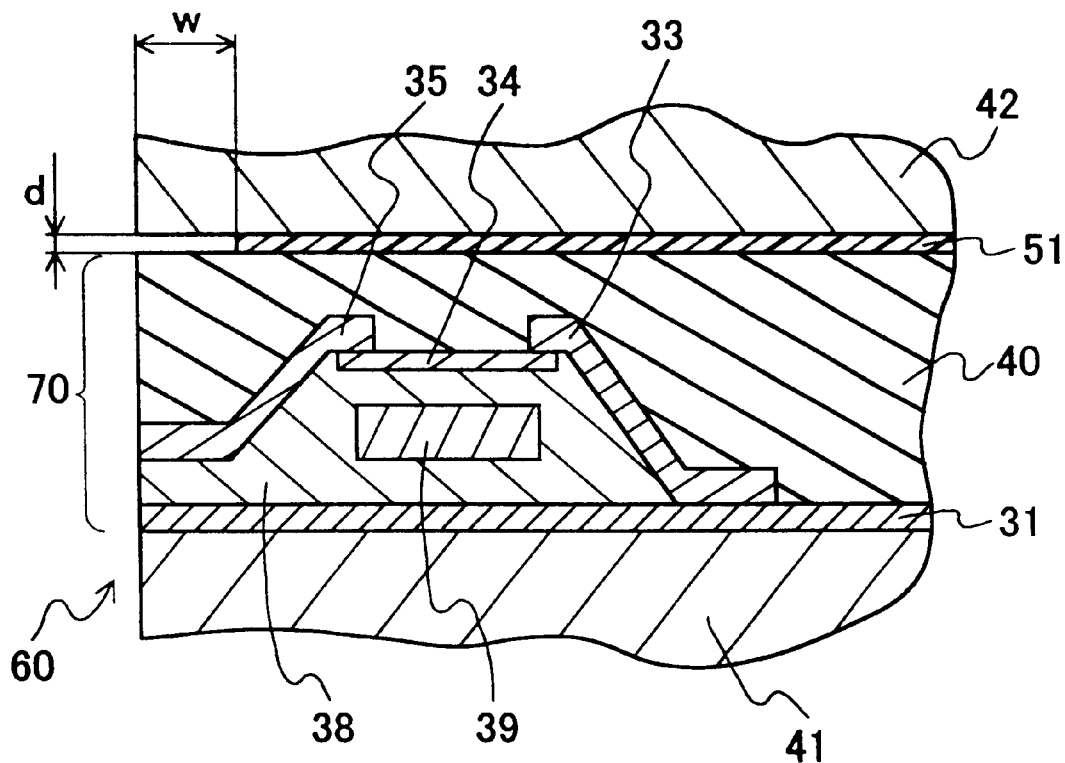
FIG. 2 is a partial cross-sectional view showing another embodiment of the MR head of the present invention.

An MR head shown in FIG. 2 also includes the members similar to those in FIG. 1. A side face on the left side of the figure is assumed to be a sliding surface 60. However, in this MR head, an adhesive film 51 is interposed between a lower substrate 41 and an upper substrate (reinforcing body) 42 so as not to be exposed to the sliding surface. Thus, even if the MR head and the recording medium are allowed to slide, the recording medium and the like can be prevented from being damaged by the movement of a component between the adhesive film and the recording medium. In order to ensure this effect, it is preferable that the adhesive film 51 retreats from the sliding surface by at least 5 μm along the interface between the substrate and the reinforcing body. Although not particularly limited, a retreat distance w preferably is about 10 μm or less.

In this MR head, an organic layer made of a conventionally used adhesive or the like may be used as an adhesive film. When an organic layer is used, bonding at a low temperature becomes possible, and the characteristics of the MR element are not damaged. Furthermore, bonding using an organic layer is advantageous in terms of cost. The film thickness (corresponding to an interval d between the substrate and the reinforcing body) of an organic layer generally may be 10 to 1000 nm, for example, about 100 nm.

However, when an adhesive is used, the film thickness of the adhesive film becomes relatively large. Furthermore, the film thickness is difficult to control, and is likely to be varied. Therefore, along with sliding between the recording medium and the MR head, magnetic powder or the like of the recording medium may be clogged between the substrate and the reinforcing body to damage the recording medium.

Thus, as shown in FIG. 2, even in the case where the adhesive film is disposed so as to retreat from the sliding surface, when the adhesive film is made of a non-organic film, characteristics of a head further can be stabilized. In this aspect, a preferable film configuration of a non-organic film is as described above. When a non-organic film is adopted, variation in film thickness can be reduced, and the interval d between the substrate and the reinforcing body can be decreased.

If the interval d is decreased, the gap between the substrate and the reinforcing body can be eliminated substantially by plastic deformation of the MR element portion, the substrate and the reinforcing body. If the interval d is eliminated, even if the MR head runs in sliding contact with the recording medium, recession is unlikely to occur. If recession can be prevented, reproduction characteristics can be obtained stably.

In the above, description has been made by illustrating a yoke-type MR head. However, the present invention also is applicable to a shield-type MR head.

Next, an example of a method for producing a yoke-type MR head will be described with reference to FIGS. 3 to 8.

Figure 3:
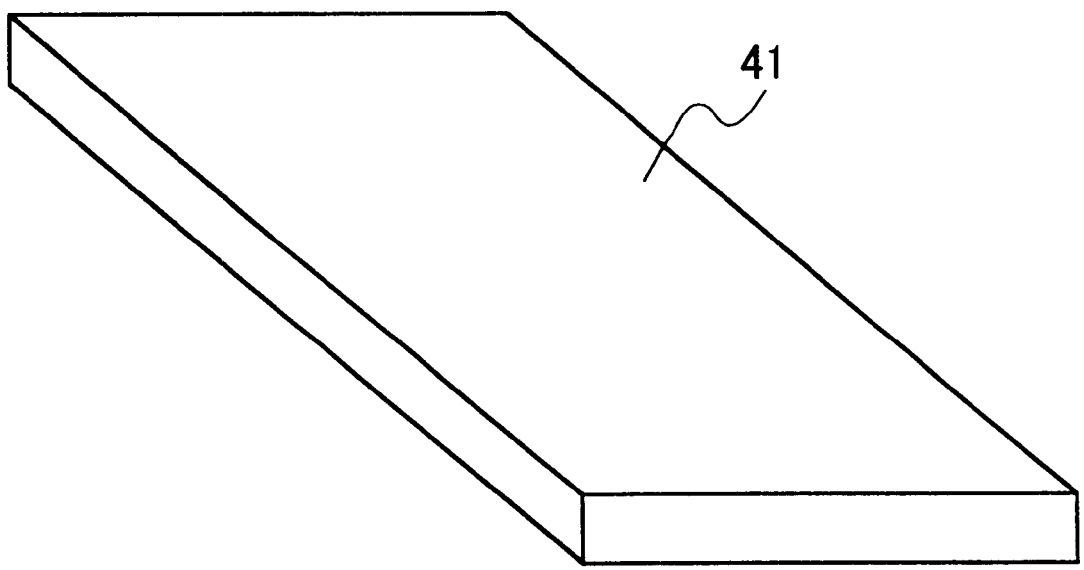
FIG. 3 is a perspective view showing an example of a substrate used for producing an MR head.
Figure 4:
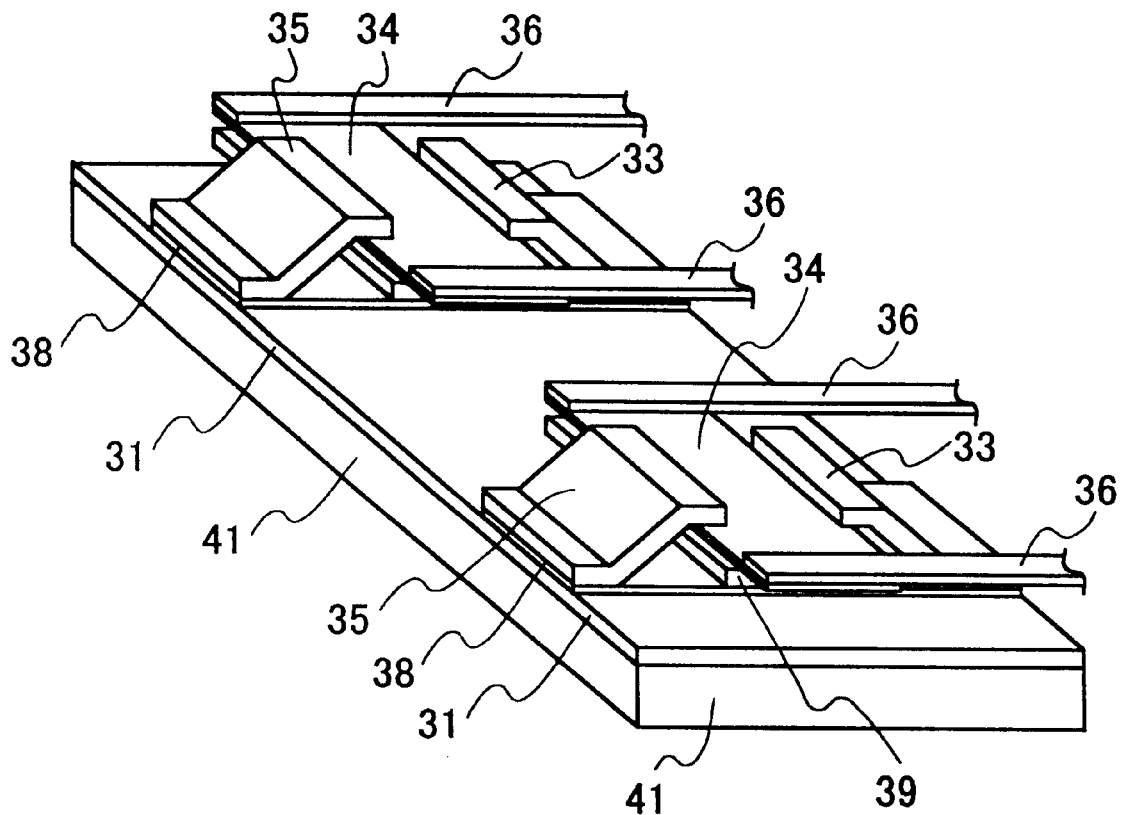
FIG. 4 is a perspective view showing an exemplary act of forming an MR element portion in the process of producing an MR head.

First, as shown in FIG. 3, a bar-shaped ceramic substrate 41 (for example, an AlTiC substrate) having a mirror-finished surface is prepared. Then, MR element portions successively are formed on the surface of the substrate by a thin film formation technique. Herein, the thin film formation technique includes a film formation technique such as sputtering and CVD (chemical vapor deposition), and a thin film treatment technique such as photolithography, ion etching, and wet-type chemical etching. Thus, as shown in FIG. 4, a plurality of MR element portions are produced on the substrate 41. Herein, an example in which two MR element portions are formed is shown. However, in order to enhance productivity, the number of elements to be formed on one substrate further may be increased.

Figure 5:
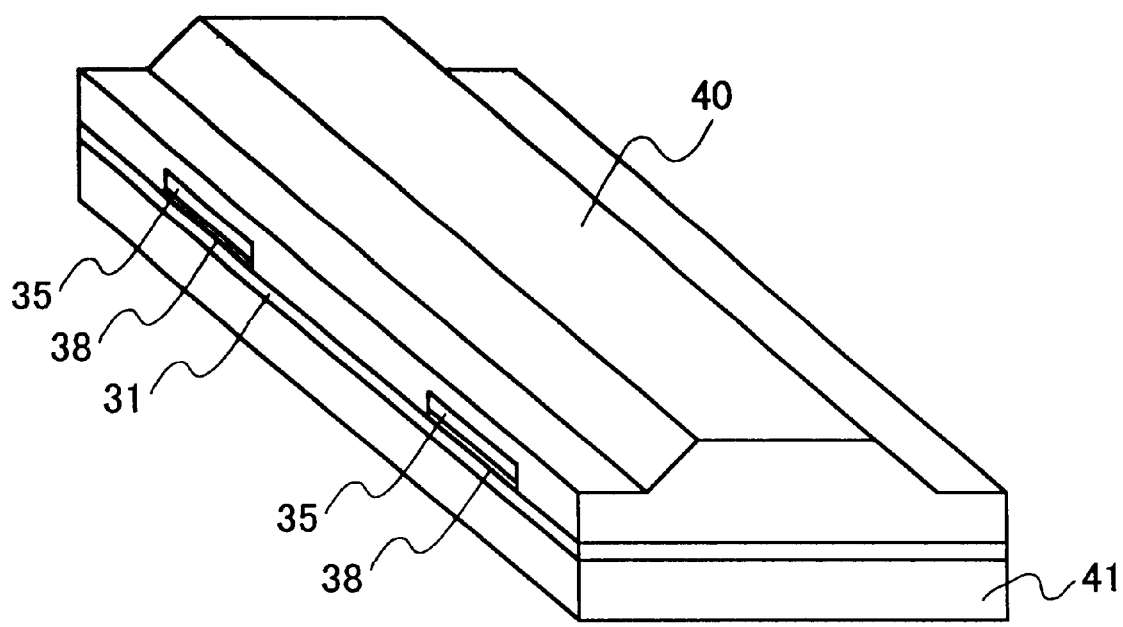
FIG. 5 is a perspective view showing an exemplary act of covering the MR element portion shown in FIG. 4 with a protective film.
Figure 6:
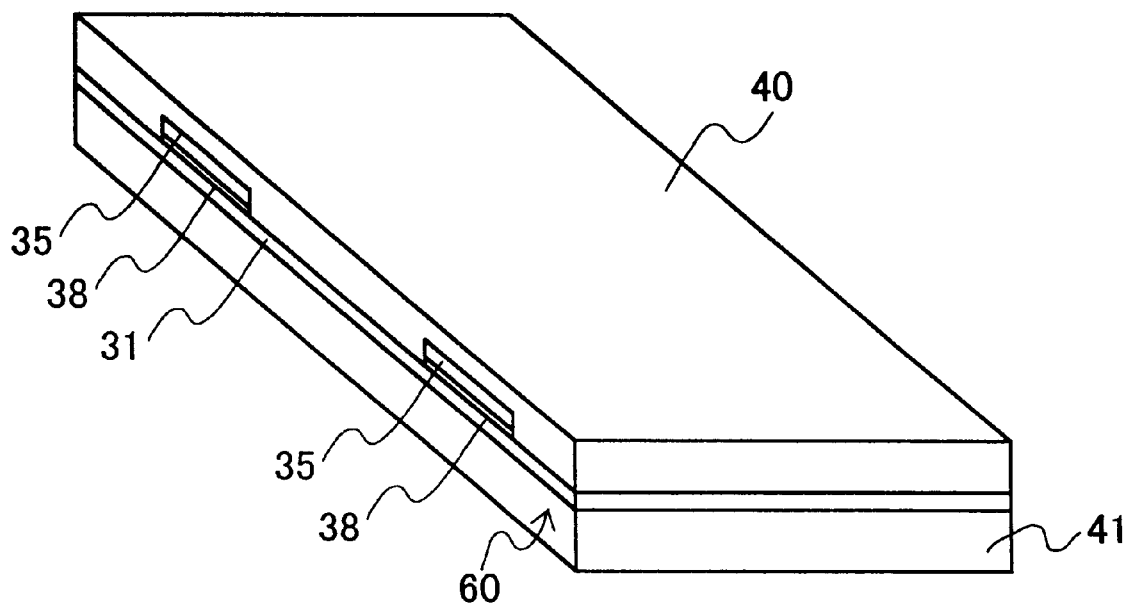
FIG. 6 is a perspective view showing an exemplary act of further forming the protective film shown in FIG. 5 to flatten the surface thereof.

Furthermore, as shown in FIG. 5, a protective film 40 is formed, for example, by sputtering. As the protective film, $Al_2O_3$ generally is suitable. Furthermore, as shown in FIG. 6, the surface of the protective film 40 is flattened by lapping or the like. The lower magnetic yoke 31, the magnetic gap 38, and the upper front magnetic yoke 35 are exposed to the sliding surface 60 together with the protective film 40.

Figure 7:
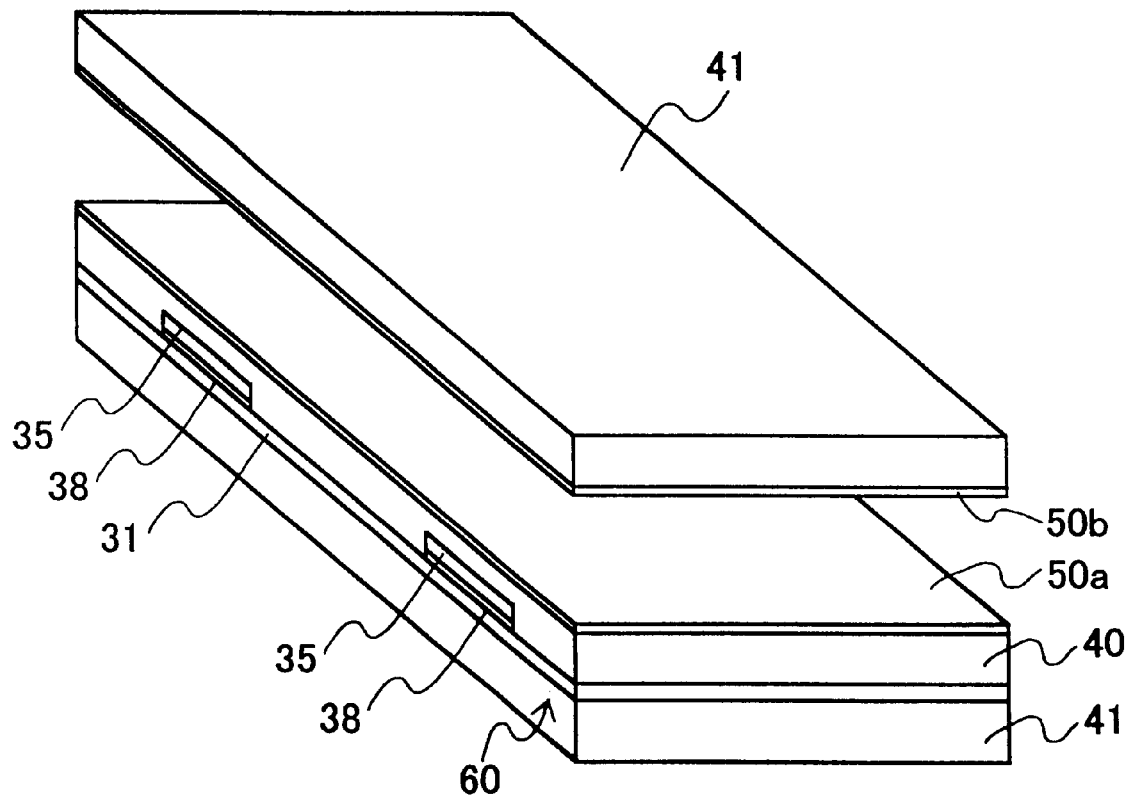
FIG. 7 is a perspective view showing an arrangement state when the substrate shown in FIG. 6 and the reinforcing body are bonded to each other.

Subsequently, as shown in FIG. 7, adhesive films 50a and 50b are formed respectively on the flattened surface and the surface of a separately prepared reinforcing body, and the substrate and the reinforcing body are stacked so that the adhesive films are brought into contact with each other. It is assumed that each of the adhesive films 50a and 50b is, for example, a two-layered film obtained by forming a Cr film and an Au film successively.

Thus, the stack is pressurized and heated under the condition that the Au films are opposed to each other, whereby solid-phase welding of the Au films is conducted. As bonding conditions in this case, a pressure of 10 MPa and a temperature of 200° C. can be illustrated. It is preferable that a heat treatment temperature is determined considering heat resistance of the MR element. Some MR elements with high characteristics have low resistance to heat, and cannot exhibit sufficient characteristics when exposed to a temperature higher than 150° C.

In general, an MR head formed by using a thin film process has its characteristics degraded by interfacial diffusion during heat treatment. At an ordinary AMR (Anisotropic Magneto-Resistive Element; Anisotropic Magneto-Resistivity), it is desirable that a heat treatment temperature is limited to about 350° C. or lower. Thus, even at the AMR, adhesion cannot be conducted by using a non-organic glass type material, and an organic material has been used.

At a GMR (Giant Magneto-Resistive Element; Giant Magneto-Resistivity), a film thickness of a constituent material is small, so that the influence of interfacial diffusion becomes large. For example, in the case of a GMR antiferromagnetic layer of spin valve type, $\alpha$-$Fe_2O_3$, its heat resistant temperature is about 150° C. or less. Thus, in such a case, it is preferable to prescribe a heat treatment temperature at 150° C. or lower. According to the above-mentioned solid-phase welding method, the substrate and the reinforcing body can be bonded to each other even at such a low temperature.

Figure 8:
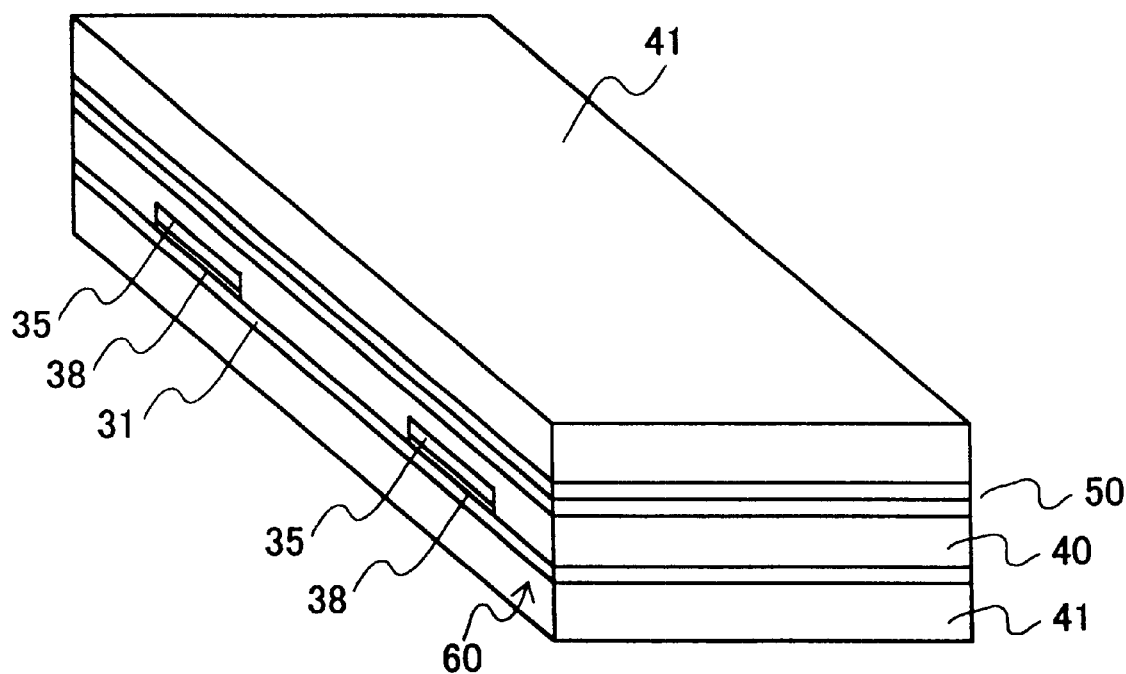
FIG. 8 is a perspective view showing an exemplary act of producing an MR head by bonding the substrate to the reinforcing body from the state shown in FIG. 7.

The material bonded as shown in FIG. 8 is cut out to complete an MR magnetic head.

In the above description, the solid-phase welding method using a noble metal layer has been described. However, if metal layers to be subjected to solid-phase welding are formed in vacuum, and continuously, the metal layers are bonded to each other in vacuum, almost all the metal and alloy can be used. If bonding surfaces are brought into contact with each other while they are kept clean in vacuum, an oxide film is not generated on the surfaces to be bonded. Thus, an MR head can be produced at a low cost without using an expensive material such as Au.

Herein, the method for producing an MR head has been described regarding a yoke-type MR head. However, the present invention similarly is applicable to a shield-type MR head.

Figure 9:
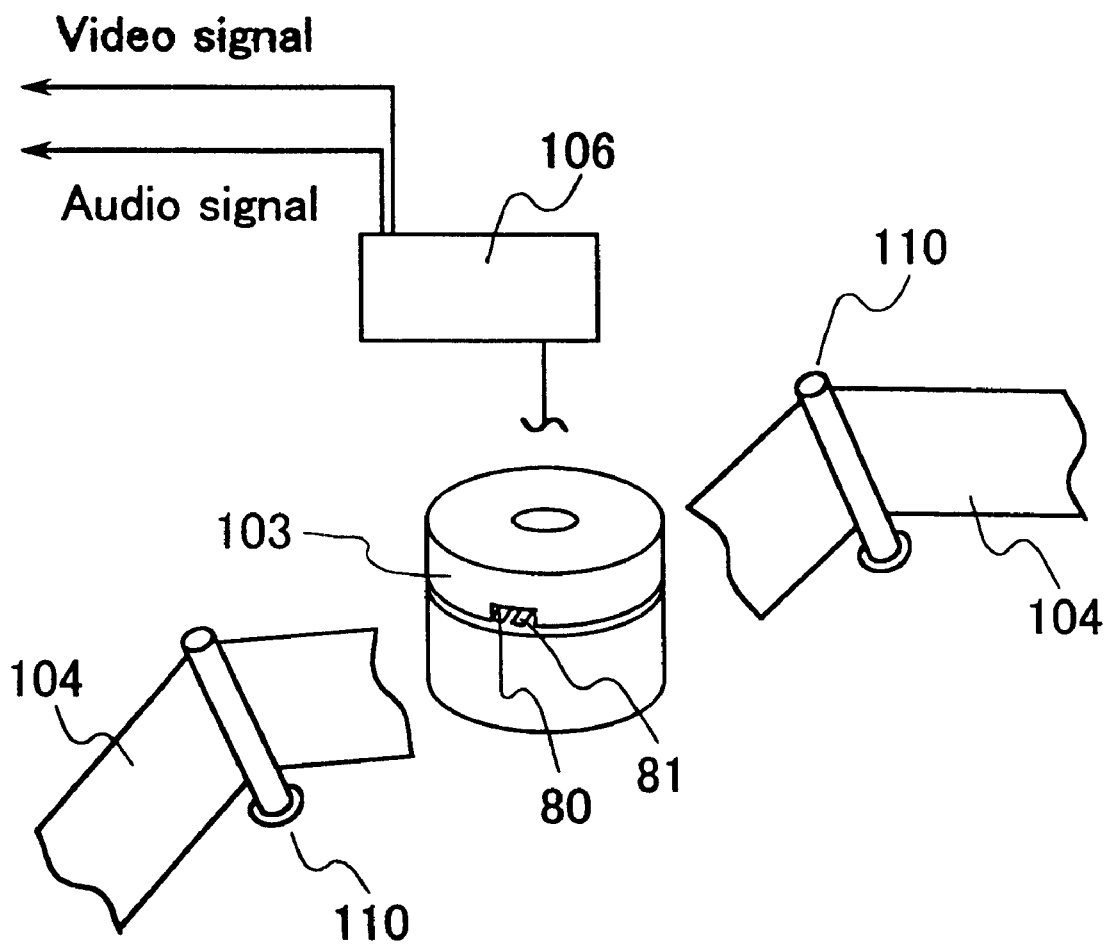
FIG. 9 is an arrangement diagram schematically showing an exemplary configuration of a magnetic recording/reproducing apparatus using the MR head of the present invention.
Figure 10:
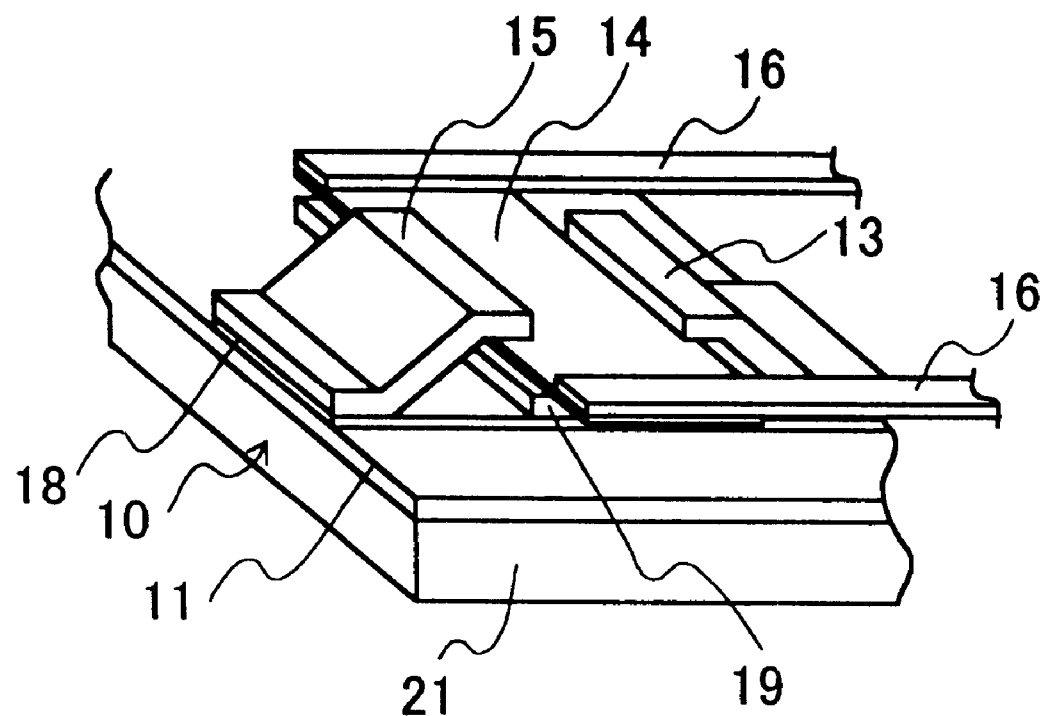
FIG. 10 is a partially cut-away perspective view showing a conventional MR head.
Figure 11:
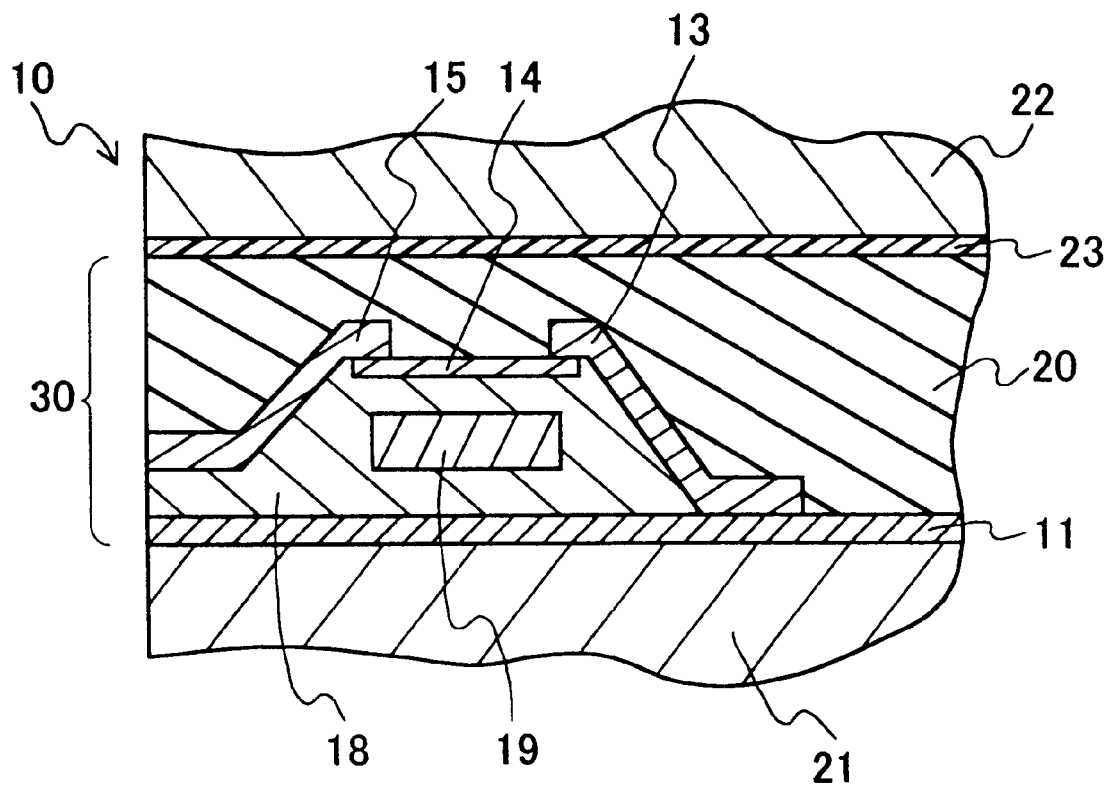
FIG. 11 is a partial cross-sectional view of the conventional MR head.

FIG. 9 shows an exemplary configuration of a magnetic recording/reproducing apparatus of the present invention. An MR head 80 of the present invention attached to a rotating drum 103 that runs helically comes into contact with a magnetic tape 104 that runs between inclined posts 110 to reproduce a signal on the magnetic tape. This signal is output from a signal processing circuit 106 as a video signal and an audio signal. As a recording head 81, although not particularly limited, a conventional inductive head may be used.

For high-density recording and reproduction, characteristics of a reproduction head are more important. Thus, the magnetic recording/reproducing apparatus is suitable for high-density recording and reproduction, and has high reliability. Furthermore, as described in the above, if the MR head of the present invention is used, even if the head and the magnetic recording medium slide, damage of the MR head and the recording medium and recession of the head can be suppressed. Therefore, reliability of reproduction and stability of reproduction characteristics can be retained high. In this manner, the characteristics of the MR head are excellent, so that the magnetic recording/reproducing apparatus particularly is suitable for high-density recording/reproduction of information such as recording of a digital signal.

In the above description, a recording/reproducing apparatus has been illustrated with a VTR and the like in mind, in which a magnetic tape is allowed to run by a rotating drum system. The present invention also is applicable to a disk-shaped medium. Furthermore, the present invention particularly is effective for an MR head using an element with a low heat resistant temperature, such as an MR head using a GMR, TMR (Tunneling Magneto-Resistive Element; Tunneling Magneto-Resistivity) element.

As described above, according to the present invention, an MR head having excellent reliability can be provided. Furthermore, a magnetic recording/reproducing apparatus having excellent reliability and reproduction efficiency can be provided.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An MR head comprising a substrate, the substrate comprising an MR element portion formed on a surface thereof, a reinforcing body, and a sliding surface with respect to a magnetic recording medium, the substrate and the MR element portion being exposed to the sliding surface, wherein the substrate and the reinforcing body are bonded to each other with the MR element portion therebetween via a non-organic film, and the non-organic film is a multi-layered film including a noble metal layer.

2. An MR head according to claim 1, wherein a thickness of the non-organic film is 20 to 90 nm.

3. An MR head according to claim 1, wherein the noble metal layer is an Au layer or a Pt layer.

4. An MR head according to claim 1, wherein the multi-layered film including a noble metal layer is a metal multi-layered film in which base metal layers respectively are disposed on both sides of the noble metal layer.

5. An MR head according to claim 4, wherein a thickness of the noble metal layer is 10 to 50 nm.

6. An MR head according to claim 4, wherein the base metal layer is a Cr layer.

7. An MR head according to claim 4, wherein thicknesses of the base metal layers respectively are 5 to 20 nm.

8. A magnetic recording/reproducing apparatus comprising the MR head of claim 1.

9. A method for producing an MR head including a substrate, an MR element portion formed on the substrate, a reinforcing body having a surface, and a sliding surface with respect to a magnetic recording medium, the substrate and the MR element portion being exposed to the sliding surface, comprising:

forming an MR element portion on a surface of the substrate;

forming a flat surface above the MR element portion;

forming non-organic films each including metal layers respectively on the flat surface and the surface of the reinforcing body, and subjecting the metal layers to solid-phase welding, thereby bonding the substrate and the reinforcing body to each other.

10. A method for producing an MR head according to claim 9, wherein the non-organic film is a metal multi-layered film obtained by successively forming a base metal layer and a noble metal layer in this order, and the noble metal layer is subjected to solid-phase welding.

11. A method for producing an MR head according to claim 10, wherein the noble metal layer is an Au layer or a Pt layer.

12. A method for producing an MR head according to claim 10, wherein thicknesses of the noble metal layers respectively are 5 nm to 25 nm.

13. A method for producing an MR head according to claim 10, wherein the base metal layer is a Cr layer.

14. A method for producing an MR head according to claim 10, wherein thicknesses of the base metal layers respectively are 5 to 20 nm.

15. A method for producing an MR head according to claim 9, wherein the metal layers are subjected to solid-phase welding at 100° C. to 200° C.

16. A method for producing an MR head according to claim 15, wherein the metal layers are subjected to solid-phase welding at 150° C. or lower.

17. A method for producing an MR head according to claim 9, wherein the metal layers are formed in an atmosphere under reduced pressure, and subsequently, subjected to solid-phase welding in the atmosphere under reduced pressure.

18. A magnetic recording/reproducing apparatus comprising the MR head obtained by the method of claim 9.

* * * * *